United States Patent [19]
Torney

[11] Patent Number: 5,351,900
[45] Date of Patent: Oct. 4, 1994

[54] METHOD OF MANUFACTURE OF QUADRUPOLE-WOUND FIBER OPTIC SENSING COIL

[75] Inventor: Everett M. Torney, Gaithersburg, Md.

[73] Assignee: Optelecom, Inc., Gaithersburg, Md.

[21] Appl. No.: 964,089

[22] Filed: Oct. 21, 1992

[51] Int. Cl.$^5$ ................................................ G01B 9/02
[52] U.S. Cl. ...................................... 242/7.03; 356/350
[58] Field of Search ........................... 356/350; 29/605; 242/7.03, 7.15, 7.07, 158 R, 159

[56] References Cited

U.S. PATENT DOCUMENTS

| | | | |
|---|---|---|---|
| 3,851,830 | 12/1974 | Barthalon | 242/7.03 |
| 3,989,200 | 11/1976 | Bachi | 242/7.03 |
| 4,583,696 | 4/1986 | Mosher | 29/605 |
| 4,668,544 | 5/1987 | Takahashi | 242/7.03 |
| 4,793,708 | 12/1988 | Bednarz | 356/350 |
| 4,808,959 | 2/1989 | Weissman | 29/605 |
| 4,856,900 | 8/1989 | Ivancevic | 356/350 |
| 4,928,894 | 5/1990 | Ohno et al. | |

OTHER PUBLICATIONS

W. L. L. Lenders, "The Orthocyclic Method of Coil Winding," vol. 23, 1961/62, No. 12, pp. 365-379, Oct. 1962.
Nicholas J. Frigo, "Compensation of Linear Sources of Non-Reciprocity in Sagnac Interferometers", Naval Research Laboratory, Washington, D.C., pp. 268-271, Apr. 1983.

Primary Examiner—Katherine Matecki
Attorney, Agent, or Firm—Kerkam, Stowell, Kondracki & Clarke

[57] ABSTRACT

A quadrupole winding for an optic sensing coil has fiber optic layers that are wound in pairs, with each layer pair beginning with fiber elements at equal distances from the coil center. Coils having a quadrupole winding pattern are less prone to errors caused by time-dependent physical changes in a section of the fiber. The coil is wound in a precision pattern, each turn lying in contact with the preceding and succeeding turn. Subsequent layers are wound with each turn lying in the groove formed by two underlying turns, with the overall winding pattern taking a hexagonally close packed configuration. Fabrication is facilitated by following every fourth-numbered layer, beginning with layer one with a two-turn pattern for passing between the subsequent two layers and a first adjacent flange, and by following every fourth-numbered layer, beginning at layer three with a two-turn pattern for passing between the subsequent two layers and a second adjacent flange.

4 Claims, 2 Drawing Sheets

METHOD OF MANUFACTURE OF QUADRUPOLE-WOUND FIBER OPTIC SENSING COIL

BACKGROUND OF THE INVENTION

This invention relates to sensing coils for, for example, fiber optic gyroscopes and to methods of manufacture thereof. More particularly, this invention relates to improved quadrupole-wound fiber optic sensing coils and method of making same.

DESCRIPTION OF PRIOR ART

Fiber optic gyroscopes comprise two main components: an interferometer, including, for example, a light source, beamsplitter, and detector; and a fiber optic sensing coil. Light from the interferometer light source is split by the beamsplitter and applied to the ends of the sensing coil. The interferometer and associated electronics process the phase relationship between the two interfering, counter-propagating beams of light that emerge from opposite ends of the coil. The difference between the phase shifts experienced by the two beams provides a measure of the rate of rotation of a platform to which the instrument is fixed. Prior art is disclosed in U.S. Pat. Nos. Ivancevic 4,856,900; Bednarz 4,793,708; and Ohno 4,928,894.

The invention disclosed in the Ivancevic patent has the shortcoming that turns of wound fiber will tend to lie in the groove formed by underlying layers, with the result that the configuration shown in the patent is not practical to fabricate.

Bednarz appears to disclose a combination of prior art from the cited reference, Lenders, W. L. L., "The Orthocyclic Method of Coil Winding," 1961, combined with prior art from a reference not cited by Bednarz but cited by a later patent. Frigo, N. J., "Compensation of Linear Sources of Non-reciprocity in Sagnac Interferometers," SPIE Proceedings, Fiber Optic and Laser Sensors, Vol. 412, pp. 268–271, (Arlington, Va, April 1983).

Ohno, U.S. Pat. No. 4,928,894 describes the prior art of quadrupole coil winding. No details are disclosed in the patent regarding individual fiber turns or layer transitions.

SUMMARY OF THE INVENTION

Applicant's improved quadrupole winding for optic sensing coils consists of layers that are wound in pairs, with each layer beginning with fiber elements at equal distances from the coil center. Coils having a quadrupole winding pattern are less prone to errors caused by time-dependent physical changes in a section of the fiber. The coil is wound in a precision pattern, with each turn lying in contact with the preceding and succeeding turn. Subsequent layers are wound with each turn lying in the groove formed by two underlying turns, with the overall winding pattern taking a hexagonally close-packed configuration. Fabrication is facilitated by following every fourth-numbered layer, beginning with layer one, with a two-turn pattern for passing between the subsequent two layers and a first adjacent flange, and by following every fourth-numbered layer, beginning at layer three with a two-turn pattern for passing between the subsequent two layers and a subsequent adjacent flange.

DETAILED DESCRIPTION OF THE INVENTION

Figure 1:
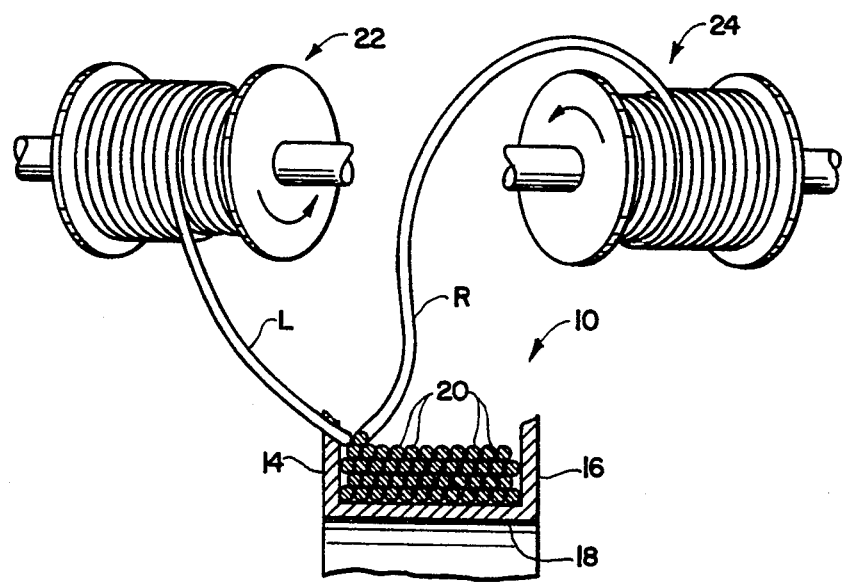
FIG. 1 is a diagrammatic view of a preferred winding system.
Figure 2:
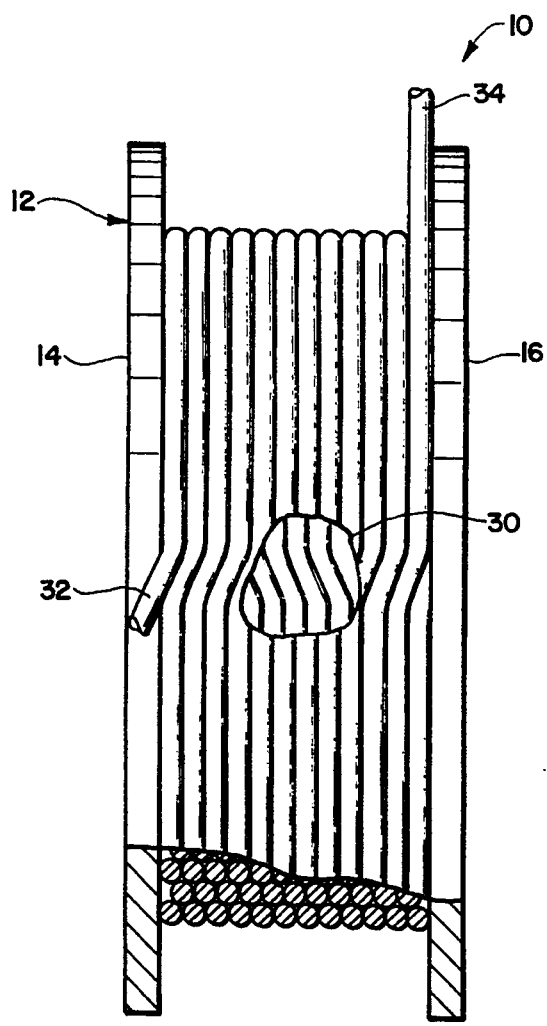
FIG. 2 is a partial, sectional view of a wound quadrupole coil.
Figure 3:
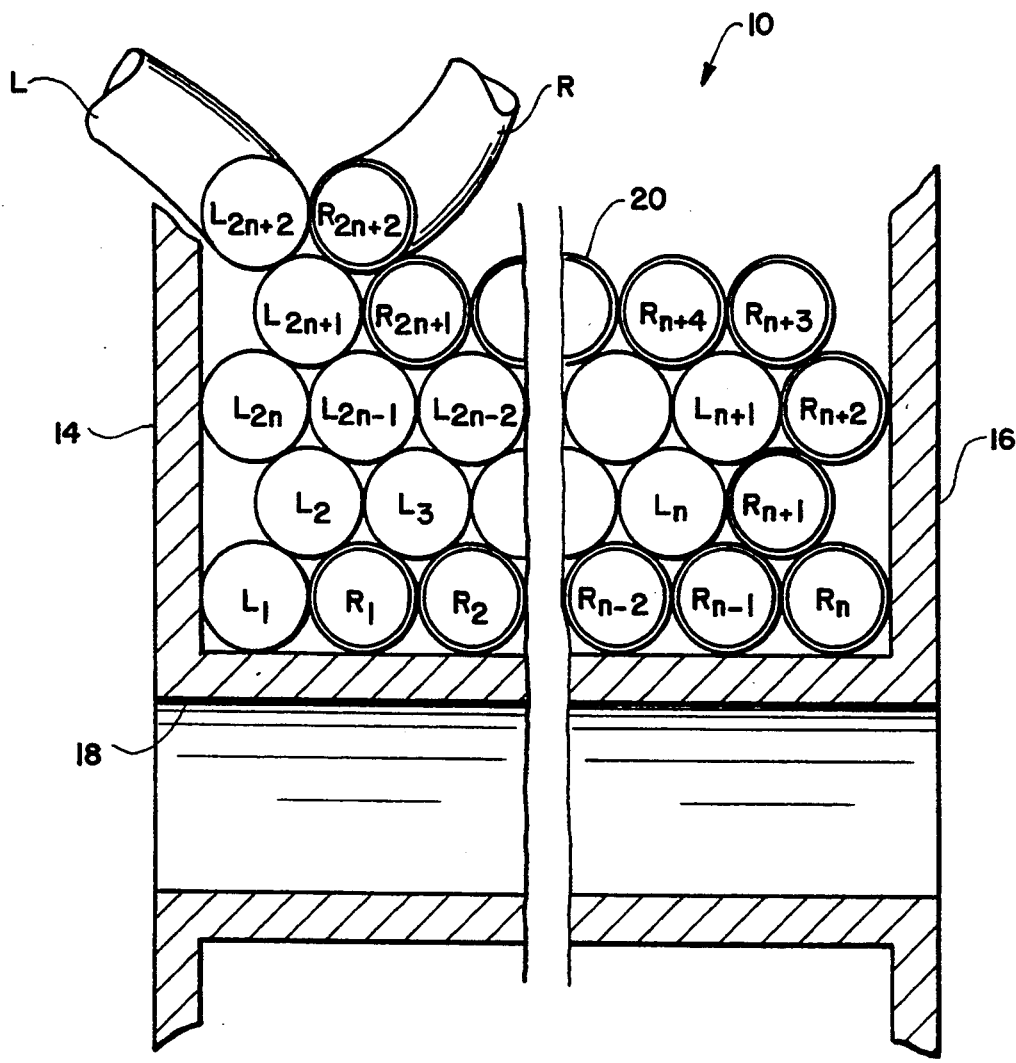
FIG. 3 is a greatly enlarged, partial, sectional view of a preferred winding pattern of the invention.

Referring to the drawings, 10 generally designates a quadrupole winding on a spool or reel 12, having end flanges 14 and 16 and a central hub 18.

The fiber 20 that forms the coil 10 is wound symmetrically about the hub 18 between flanges 14 and 16. The supply for the coil comprises two reels 22 and 24, with each of the reels containing equal amounts of optical fiber wound from the center of a continuous optical fiber, so that each reel 22 and 24 contains an equal amount of the total length of the fiber to be wound to form the quadrupole winding 10. By way of example, the total length of the optical fiber may be from about 100 to about 2,000 meters. The fiber from reel or spool 22 is designated L, and the fiber from reel or spool 24 is hereinafter designated R.

The following procedures are to be followed in winding the quadrupole fiber optic sensor of the invention:

All winding takes place between the boundaries of perpendicular flanges. All fiber turns designated $L_i$ are wound with fiber fed from reel L. All fiber turns designated $R_i$ are wound with fiber fed from reel R. Begin with one turn of fiber resting against the left flange, designated turn $L_1$. Place the center of the total length of fiber to be wound at the point where turn $R_1$ begins. Complete a layer of fiber turns in contact with center mandril. Turn $R_1$ lies in a plane perpendicular to the mandril axis until it has nearly completed a full turn. Then, it bends to the side in shallow compound curve comprising a curve to the right to avoid colliding with the beginning of turn $R_1$, followed by a curve to the left to line up in position for turn $R_2$. All turn transition compound curves lie approximately on a band parallel to the mandril axis. Each turn in layer 1 lies over most of its circumference, in a plane perpendicular to the mandril axis and the fiber is in contact with the preceding turn around the entire mandril circumference. The last turn in layer 1 designated turn $R_n$ lies in contact both with turn $R_{n-1}$ and with the right flange. Turn $R_{n+1}$ lies in the groove formed by turns $R_{n-1}$ and $R_n$. Turn $R_{n+1}$ is supported in stable equilibrium. Turn $R_{n+2}$ is supported in stable equilibrium between turn $R_{n+1}$ and the right flange. At the point of transition from turn $R_{n+1}$ to turn $R_{n+2}$, surface treatment is applied to the fiber to increase friction and avoid the first bit of turn $R_{n+2}$ sliding over to the position adjacent to turn $R_{n+1}$ and in the groove formed by turns $R_{n-1}$ and $R_{n-2}$. Upon completion of turn $R_{n+2}$, which means when the last bit of turn $R_{n+2}$ starts to climb up on the first bit of turn $R_{n+2}$, the fiber from reel R is secured against unwinding and turns $L_2$ through $L_{2n+2}$ are wound from Reel L. Securing means may comprise an adhesive/primer or an adhesive tape. Turns $L_2$ through $L_n$ are wound in grooves formed by turns $L_1$ through $R_{n-1}$. Around most of their circumferences, turns $L_2$ through $L_n$ lie in planes perpendicular to the mandril axis, guided by the underlying grooves. The transition from turn $L_i$ to turn $L_{i+1}$ is initiated by contact with the compound curve transition in layer 1. In making the transition from turn $L_i$ to turn $L_{i+1}$, fiber will follow a compound curve, helically wrapping around the end portion of turn transition compound curve on layer 1. All succeeding layers are comprised of turns which lie in underlying grooves and in planes perpendicular to the mandril axis over all of their circumference except a turn transition portion where they are in helical engagement around an underlying layer. Turn transitions on layer 2 lie approximately in a band parallel to the mandril axis and displaced from the band of layer 1 turn transitions by approximately 3 mm with a 30 mm coil diameter, for example. The displacement of turn transition bands in all layers after layer 1 is such that a turn in layer j will complete a turn transition before completely passing the turn transition band of layer j-1.

Turn $L_{n+1}$, the first turn in layer 3, lies in the groove formed by turns $R_{n+1}$ and $L_n$. Turns $L_{n+1}$ through $L_{2n}$, together with turn $R_{n+2}$, comprise layer 3. Turn $L_{2n}$ lies in contact both with turn $L_{2n-1}$ and $L_2$ and with the left flange. Turn $L_{2n+1}$ lies in the groove formed by turn $L_{2n-1}$ and $L_{2n}$. Turn $L_{2n+1}$ is supported in stable equilibrium. Turn $L_{2n+2}$ is supported in stable equilibrium between turn $L_{2n+1}$ and the left flange. At the point of transition from turn $L_{2n+1}$ to turn $L_{2n+2}$, surface treatment is applied to the fiber to increase friction and avoid the first bit of turn $L_{2n+2}$ sliding over to the position adjacent to turn $L_{2n+1}$ and in the groove formed by turns $L_{2n-2}$ and $L_{2n-1}$. Upon completion of turn $L_{2n+2}$, which means when the last bit of turn $L_{2n+2}$ starts to climb up on the first bit of turn $L_{2n+2}$, the fiber from reel L is secured against unwinding and turns $R_{n+3}$ through $R_{2n+1}$ are wound in layer 4. Turn $R_{2n+2}$ is wound in the grove formed by turns $R_{2n+1}$ and $L_{2n+1}$. Layers after layer 4 are wound in groups of four with turns $L_{P(2n+1)+1}$ and $R_{P(2n+1)+1}$ (P is a positive integer) being in the same relationship to turns in the (P+1)th group of four layers turns $L_1$ and $R_1$ are to turns in the first group of four layers. The entire winding is comprised of an integer number of four layer groups wound in an identical pattern to that described with reference to layers 1 through 4.

When the desired length of fiber has been wound into the coil 10, the ends of the fiber 32 and 34 are coupled to optical interferometers and associated electronics to process the phase relationship between two interfering, counter-propagating beams of light when they emerge from the opposite ends 32 and 34 of the sensing coil. In the past, sensing coils were adversely affected by temperature variations, vibration, both acoustical and mechanical, and employing the sensing coil wound as hereinbefore described reduces, to a minimum, such adverse effects.

| TYPICAL PARAMETERS | |
| --- | --- |
| Optical Fiber: | |
| Diameter | 0.008 |
| Length | 200 to 3,000 meters |
| Number of Layers on Spool | 16 Layers to 100 Layers |

I claim:

1. A method of winding an optical fiber sensor in a quadrupole configuration comprising:
   (a) forming first and second wound optical fiber supplies, each consisting of one-half the total length of fiber to be wound into said sensor;
   (b) winding a first turn of said fiber intermediate said fiber length against a first flange of a spool;
   (c) winding from the first optical fiber supply from the first turn to a second flange of the spool to form a first layer, winding one turn in a second layer lying in a groove formed by the last two turns in the first layer and winding an additional one turn in a third layer resting against the second flange and the fiber turn just made in the second layer;
   (d) winding the second layer from the second supply in grooves formed by the turns of the first layer from a first groove spaced one turn from the first flange toward the second flange to the previously wound one turn in the second layer while rotating the spool in the opposite rotational direction to that used for winding the first layer;
   (e) winding a third layer from the second supply in grooves formed by the turns of the second layer, starting at a first groove spaced one turn from the second flange and proceeding to the first flange, with the spool rotating in the same direction as was used for winding the second layer; winding one turn in a fourth layer lying in a groove formed by the last two turns in the third layer and winding one turn in a fifth layer resting against the first flange and on the fiber turn just made in the fourth layer;
   (f) winding said fourth layer from the first supply in grooves formed by the turns of the third layer from a first groove spaced one turn from the second flange and rotating the spool in the same direction of rotation to that used for winding the first layer;
   (g) winding the fifth layer from the first supply in grooves formed by the turns of the fourth layer with the spool turning in the same direction as was used for the first and fourth layers starting at a first groove spaced one turn the first flange and proceeding to the second flange, winding a turn in a sixth layer lying in grooves formed by the last two turns in the fifth layer and winding one turn in a seventh layer resting against the first flange and on the fiber turn just made in the sixth layer;
   (h) repeating steps (d)-(g) until all of the optical fiber from the first and second optical fiber supplies is wound;
   (i) winding each of said turns to include a first portion oriented perpendicular to the axis of said coil and a second portion angularly disposed with respect thereto.

2. The method defined in claim 1, wherein, when winding the second angularly disposed portion, the winding forms a compound curve comprising a curve in the direction of successive turns, followed by a curve in the opposite direction.

3. The method defined in claim 1, wherein step (c) includes securing the fiber against unwinding from the first supply after winding the turn in the third layer and step (e) includes securing the fiber against unwinding from the second supply after winding the turn in the fifth layer.

4. The method defined in claim 1, wherein step (c) includes applying surface treatment to the fiber to increase friction between turns in the second and third layers and thereby prevent the first bit of the fiber turn in the third layer from slipping away from the flange and step (e) includes applying surface treatment to the fiber to increase friction between turns in the fourth and fifth layers and thereby prevent the first bit of the fiber turn in the fifth layer from slipping away from the flange.

* * * * *

UNITED STATES PATENT AND TRADEMARK OFFICE
CERTIFICATE OF CORRECTION

PATENT NO. : 5,351,900
DATED : Oct. 4, 1994
INVENTOR(S) : Everett M. TORNEY

It is certified that error appears in the above-indentified patent and that said Letters Patent is hereby corrected as shown below:

Column 4, 5th line under Claim 1.(g) - Insert the word "from" after the word "turn".

Signed and Sealed this

Thirteenth Day of December, 1994

Attest:

BRUCE LEHMAN

*Attesting Officer*    Commissioner of Patents and Trademarks